(12) United States Patent
Shen

(10) Patent No.: US 8,310,819 B2
(45) Date of Patent: Nov. 13, 2012

(54) FOLDABLE ELECTRONIC DEVICE

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 244 days.

(21) Appl. No.: 12/830,529

(22) Filed: Jul. 6, 2010

(65) Prior Publication Data

US 2011/0273821 A1 Nov. 10, 2011

(30) Foreign Application Priority Data

May 5, 2010 (TW) .............................. 99208339 U

(51) Int. Cl.
*G06F 1/16* (2006.01)

(52) U.S. Cl. ................................................. 361/679.01

(58) Field of Classification Search ............... 361/679.01
See application file for complete search history.

(56) References Cited

U.S. PATENT DOCUMENTS

| | | | |
|---|---|---|---|
| 8,089,748 B2* | 1/2012 | Chiang | 361/679.01 |
| 2006/0046792 A1* | 3/2006 | Hassemer et al. | 455/575.1 |
| 2007/0067954 A1* | 3/2007 | Finney et al. | 16/235 |
| 2008/0174942 A1* | 7/2008 | Yang et al. | 361/680 |
| 2010/0046149 A1* | 2/2010 | Wang et al. | 361/679.01 |
| 2011/0026203 A1* | 2/2011 | Ligtenberg et al. | 361/679.01 |
| 2011/0051331 A1* | 3/2011 | Shi et al. | 361/679.01 |
| 2011/0157781 A1* | 6/2011 | Peng | 361/679.01 |
| 2011/0164354 A1* | 7/2011 | Wu et al. | 361/679.01 |
| 2011/0194232 A1* | 8/2011 | Saila | 361/679.01 |
| 2011/0292618 A1* | 12/2011 | Naukkarinen et al. | 361/729 |

\* cited by examiner

*Primary Examiner* — Lisa Lea Edmonds
(74) *Attorney, Agent, or Firm* — Altis Law Group, Inc.

(57) ABSTRACT

An electronic device includes a base with a first magnetic member, a connecting member slidably mounted to the base, and a cover with a second magnetic member. The cover is pivotably connected to the connecting member. The first and second magnetic members are aligned and attached with each other using magnetism, for retaining the cover in a closed state relative to the base. The cover is capable of being pushed to slide forward relative to the base to stagger and release the first and second magnetic members from each other, for releasing the cover from the base.

15 Claims, 7 Drawing Sheets

FOLDABLE ELECTRONIC DEVICE

BACKGROUND

1. Technical Field

The disclosure relates to a foldable electronic device with a hinge.

2. Description of Related Art

A foldable electronic device, such a as notebook computer, a portable phone, a personal digital assistant (PDA), usually includes a base and a display pivotably hinged to the base. Usually, the display is locked to the base via a latch mechanism. When opening the electronic device, the latch mechanism is operated to release the display from the base, and then the display can be rotated to be open or closed. However, it is often very difficult to open or close the display of the electronic device.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
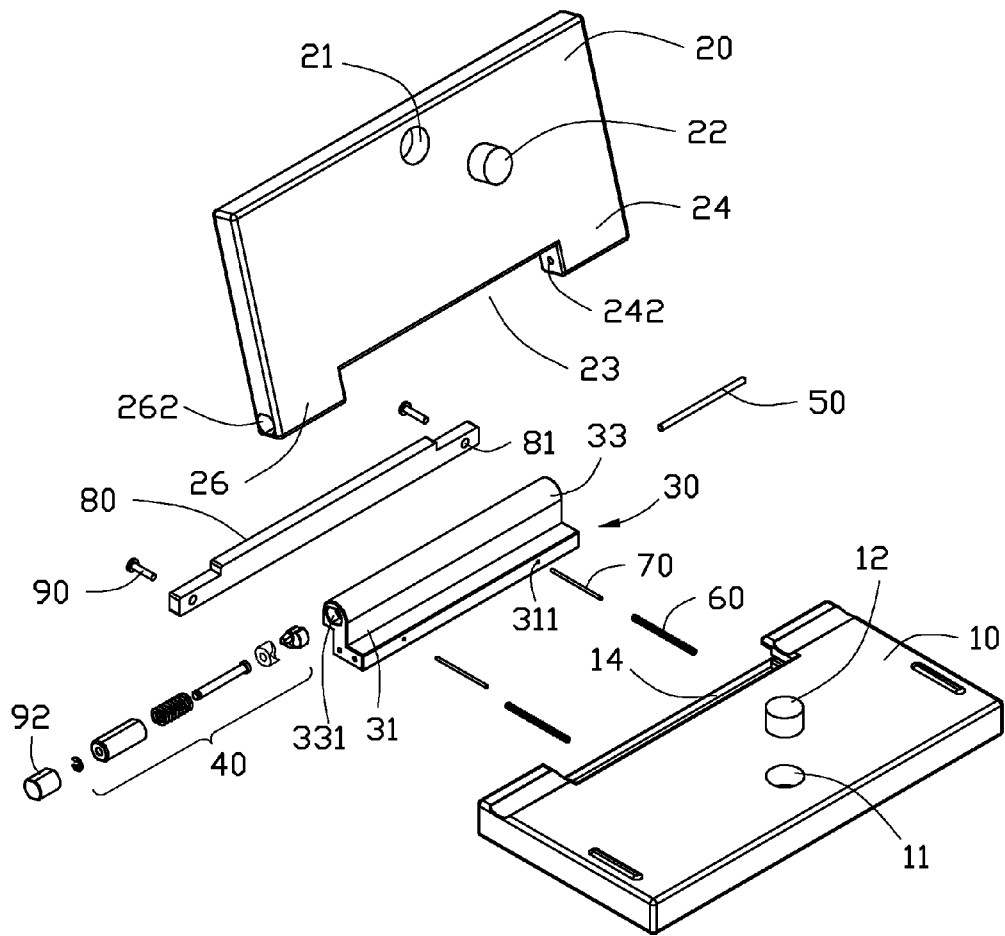
FIG. 1 is an exploded, isometric view of an embodiment of a foldable electronic device including a hinge.
Figure 2:
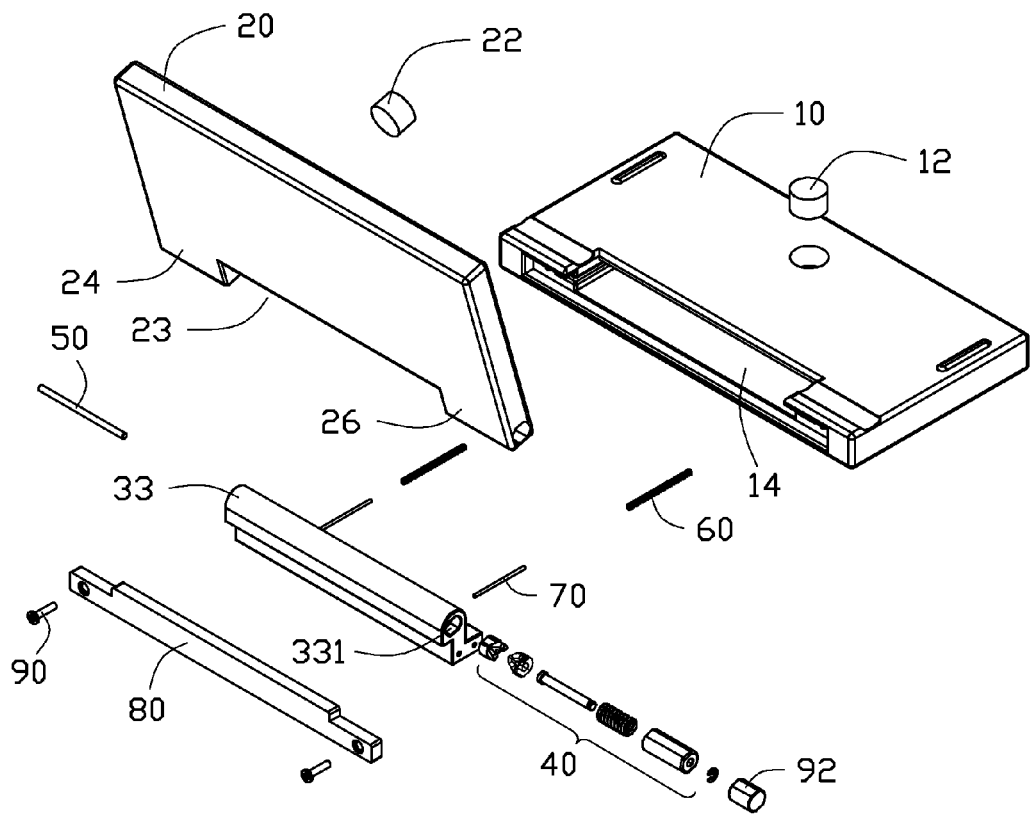
FIG. 2 is similar to FIG. 1, but viewed from another perspective.

Referring to FIGS. 1 and 2, an embodiment of a foldable electronic device, such as a notebook computer, includes a base 10, a cover 20, a connecting member 30, a hinge 40, a pivoting shaft 50, two springs 60, two poles 70, a mounting member 80, and two fasteners 90.

A top surface of the base 10 defines a receiving space 11 for receiving and fixing a first magnetic member 12. A rear side of the base 10 defines a receiving portion 14 for slidably receiving the connecting member 30. Two receiving holes (not shown) are defined in the receiving portion 14 for receiving the two springs 60, respectively.

A bottom surface of the cover 20 defines a receiving space 21 for receiving and fixing a second magnetic member 22 corresponding to the first magnetic member 12. A rear side of the cover 20 defines a cutout 23. Two pivoting portions 24 and 26 are formed at opposite sides of the cutout 23. A though hole 242 is defined in one of the pivoting portions 24, communicating with the cutout 23. A noncircular, such as double-D shaped, accommodating hole 262 is defined in the pivoting portion 26, communicating with the cutout 23.

The connecting member 30 includes an L-shaped main body 31 and a connecting portion 33 extending from a top of the main body 31. One side of the main body 31 opposite to the connecting portion 33 defines two mounting holes 311 facing the base 10. A first end of the connecting portion 33 axially defines a noncircular, such as double-D shaped, fixing hole 331. A second end of the connecting portion 33 opposite to the first end axially defines a pivot hole (not shown).

Figure 3:
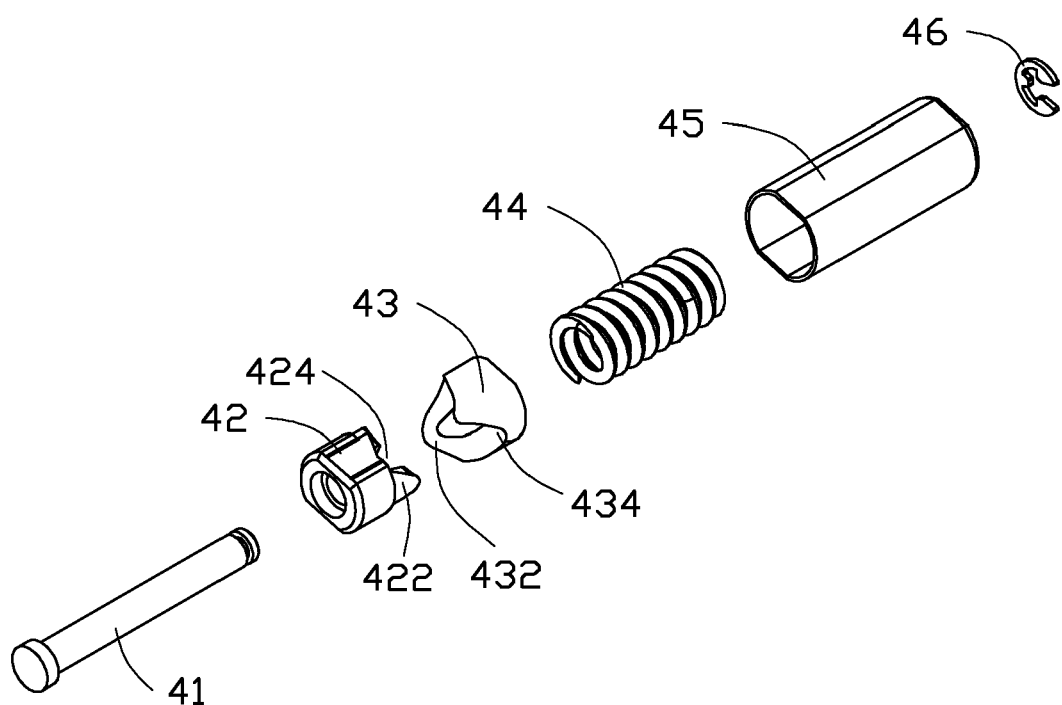
FIG. 3 is an enlarged, isometric view of the hinge of FIG. 1, but viewed from another perspective.

Referring to FIG. 3, the hinge 40 is used to pivotably connect the connecting member 30 to the cover 20. The hinge 40 includes a shaft 41, a first interfering member 42, a second interfering member 43 mated with the first interfering member 42, a resilient member 44, such as a coil spring in this embodiment, a sleeve 45, and a mounting member 46, such as a C-clip. The shaft 41 extends through the first interfering member 42, the second interfering member 43, the coil spring 44, and the sleeve 45 in that order, to engage with the mounting member 46, thereby preventing the first interfering member 42, the second interfering member 43, the coil spring 44, and the sleeve 45 from disengaging from the shaft 41.

The coil spring 44 and the second interfering member 43 are received in the sleeve 45. The second interfering member 43 is fixedly secured in the sleeve 45. A cross section of the second interfering member 43 is substantially the same shape and size as the sleeve 45. In one embodiment, the cross section of the second interfering member is substantially oval. One end of the first interfering member 42 facing the second interfering member 43 forms at least one raised portion 422 and at least one recessed portion 424. One end of the second interfering member 43 facing the first interfering member 42 forms at least one raised portion 432 and at least one recessed portion 434 for mating with the at least one raised portion 422 and the at least one recessed portion 424 of the first interfering member 42, respectively. The first interfering member 42 and the second interfering member 43 are rotatable relative to each other. A cross section of the first interfering member 42 is noncircular, such as double-D shaped, to be non-rotatably fixed in the fixing hole 331 of the connecting portion 33. A cross section of the sleeve 45 has a similar shape and size as the accommodating hole 262 of the cover 20, to be non-rotatably fixed in the accommodating hole 262.

The mounting member 80 is generally T-shaped, with each end of the mounting member defining a mounting hole 81.

Figure 4:
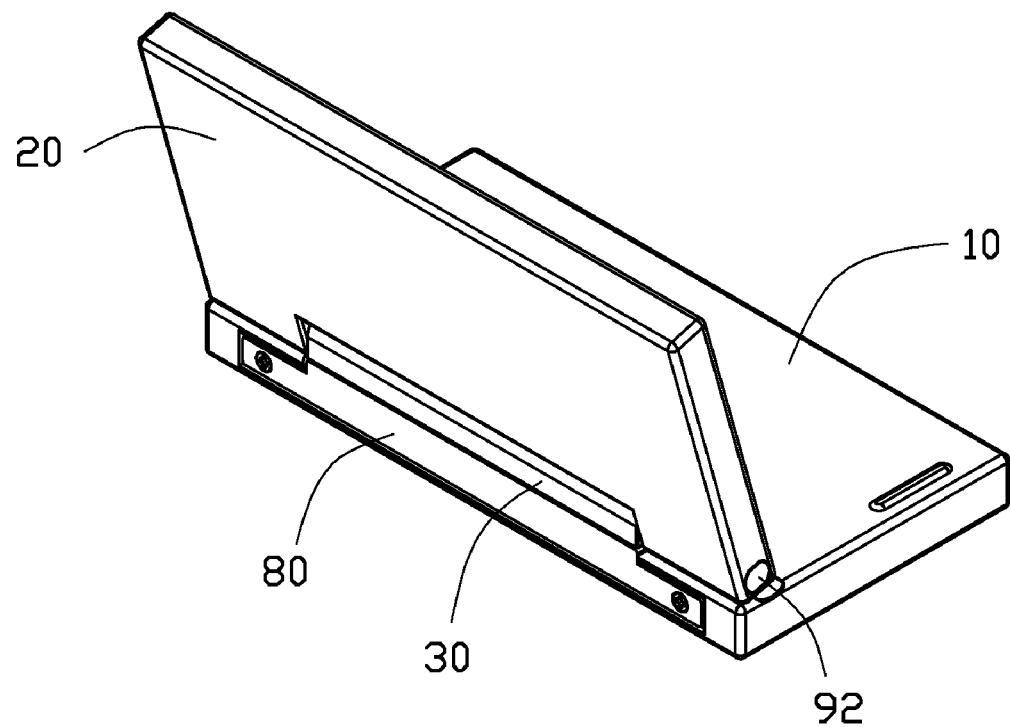
FIG. 4 is an assembled, isometric view of the electronic device of FIG. 1.
Figure 5:
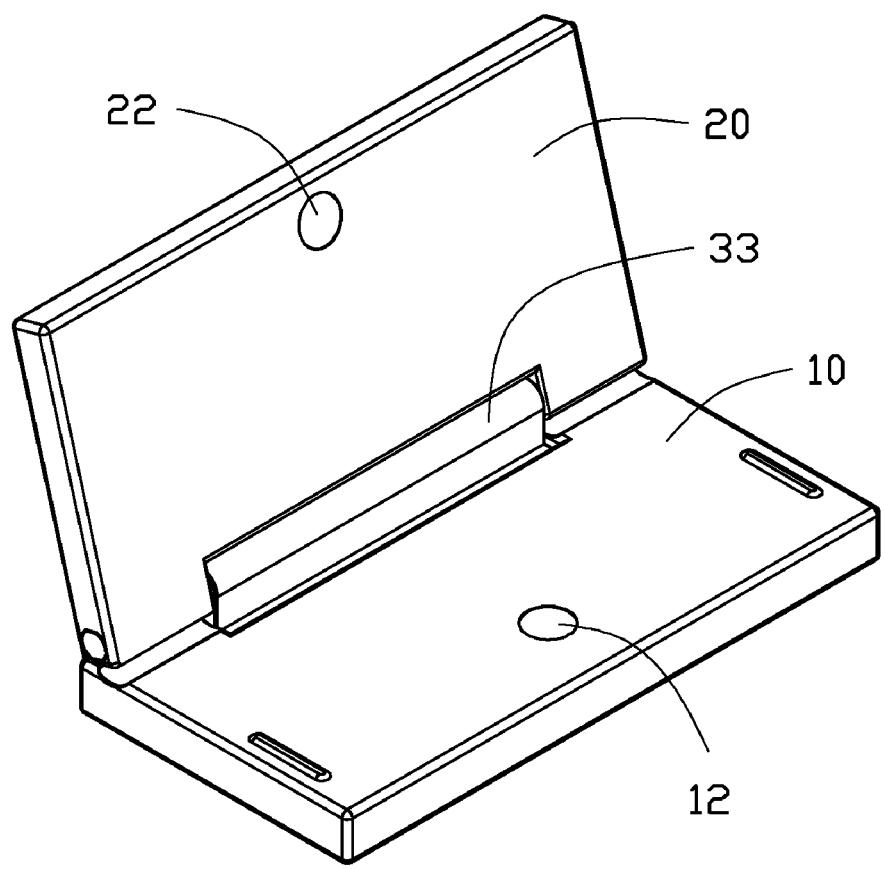
FIG. 5 is an assembled, isometric view of the electronic device of FIG. 2.

Referring to FIGS. 4 and 5, in assembly, the ends of the poles 70 are first fixed in the mounting holes 311 of the connecting member 30. The two springs 60 shroud the poles 70. The main body 31 of the connecting member 30 is accommodated in the receiving portion 14 of the base 10, with the springs 60 received in the corresponding receiving holes of the base. Therefore, the connecting member 30 is slidably received in the receiving portion 14 of the base 10. The two fasteners 90 extend through the corresponding mounting holes 81 of the mounting member 80 to screw in a rear surface of the base 10, and fix the mounting member 80 to the base 10. The springs 60 are used for restoring the connecting member 30. The poles 70 are used for preventing the corresponding springs 60 from deviating from a functional path.

The connecting portion 33 of the connecting member 30 is received in the cutout 23 of the cover 20. The accommodating hole 262 of the cover 20 is aligned with the fixing hole 331 of the connecting member 30, and the through hole 242 of the cover 20 is aligned with the pivot hole of the connecting member 30 opposite to the fixing hole 331. The pivoting shaft 50 extends through the through hole 242 of the cover 20 to engage in the pivot hole of the connecting member 30. The hinge 40 extends through the accommodating hole 262 of the cover 20 to engage in the fixing hole 331 of the connecting member 30. The first interfering member 42 of the hinge 40 is fixed in the fixing hole 331 of the connecting member 30. The sleeve 45 of the hinge 40 is fixed in the accommodating hole 262 of the cover 20. A plug 92 is inserted into the accommodating hole 262 of the cover 20, for preventing the hinge 40 from disengaging from the accommodating hole 262 of the cover 20. The mounting member 80 is used for limiting the connecting member 30 from sliding away from the base 10. Accordingly, the cover 20 is rotatably mounted to the connecting member 30, and the connecting member 30 is slidably mounted to the base 10.

In other embodiments, two hinges 40 may be used for connecting the cover 20 and the connecting member 30 at opposite ends of the connecting member 30.

Figure 6:
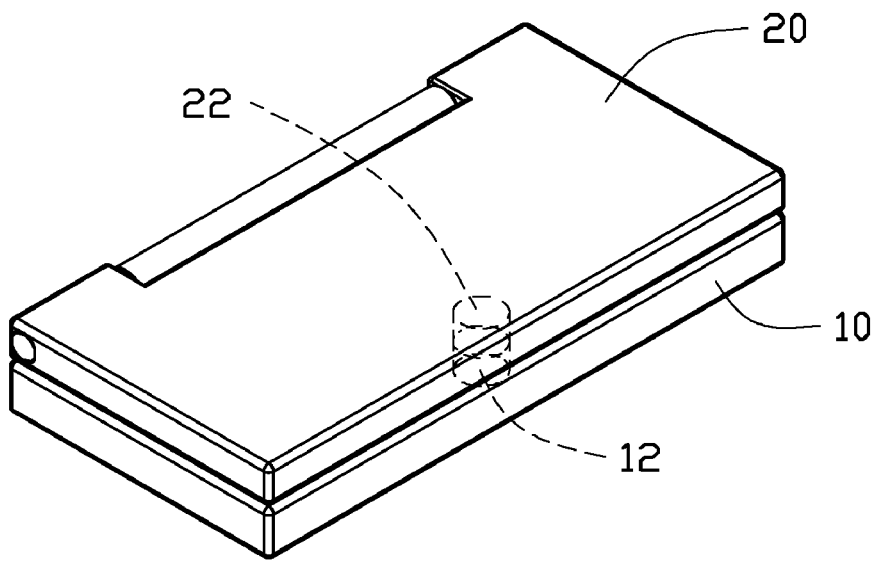
FIG. 6 is an isometric view of the electronic device of FIG. 5 shown in one state.

Referring to FIG. 6, when the cover 20 is closed relative to the base 10, the at least one raised portion 422 of the first interfering member 42 engages with the at least one raised portion 432 of the second interfering member 43, to compress the resilient member 44. The first magnetic member 12 of the base 10 and the second magnetic member 22 of the cover 20 are aligned and attached to each other using magnetism, for retaining the cover 20 in a closed state relative to the base 10.

Figure 7:
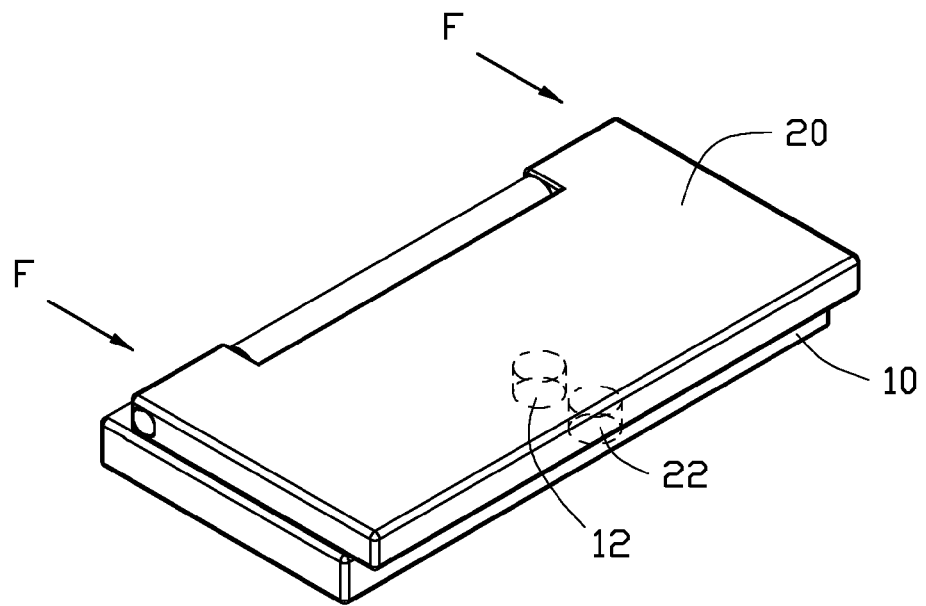
FIG. 7 is similar to FIG. 6, but shown in another state.

Referring to FIG. 7, when the cover 20 needs to open relative to the base 10, the cover 20 is pushed against the springs 60 to slide forward relative to the base 10 along the F direction away from the mounting member 80. Accordingly, the first magnetic member 12 of the base 10 and the second magnetic member 22 of the cover 20 are staggered and released from each other, for releasing the cover 20 from the base 10. The resilient member 44 of the hinge 40 is restored. Thereby, the at least one raised portion 432 of the second interfering member is disengaged from the at least one raised portion 422 of the first interfering member 42, to engage in the at least one recessed portion 424 of the first interfering member 42, so that the cover 20 can rotate to open relative to the base 10.

Therefore, it is easier to open or close the cover 20 relative to the base 10 of the electronic device.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device comprising:
a base;
a first magnetic member fixed to the base;
a connecting member slidably mounted to a rear side of the base;
an elastic member arranged between the base and the connecting member;
a cover pivotably connected to the connecting member by a hinge; and
a second magnetic member fixed to the cover, wherein the first and second magnetic members are aligned and are attached to each other using magnetism, for retaining the cover in a closed state relative to the base;
wherein the cover is pushed to slide the connecting member forward relative to the base against the elastic member to stagger and release the first and second magnetic members from each other, for releasing the cover from the base;
wherein the elastic member restores the connecting member after releasing the cover from the base; and
wherein the hinge comprises a shaft, a first interfering member, a second interfering member mated with the first interfering member, a resilient member, a sleeve, and a mounting member; the shaft extends through the first interfering member, the second interfering member, the resilient member, and the sleeve in that order, to engage with the mounting member.

2. The electronic device of claim 1, wherein the resilient member and the second interfering member are received in the sleeve, the second interfering member being fixedly secured in the sleeve.

3. The electronic device of claim 1, wherein one end of the first interfering member facing the second interfering member forms at least one first raised portion and at least one first recessed portion; one end of the second interfering member facing the first interfering member forms at least one second raised portion and at least one second recessed portion for mating with the at least one first raised portion and the at least one second recessed portion of the first interfering member, respectively.

4. The electronic device of claim 1, wherein a rear side of the cover defines a cutout, the connecting member comprises a main body and a connecting portion extending from a top of the main body, the main body is slidably fixed to the base, and the connecting member is received in the cutout of the cover.

5. The electronic device of claim 4, wherein one end of the connecting portion defines a fixing hole, and the first interfering member is non-rotatably fixed in the fixing hole of the connecting portion.

6. The electronic device of claim 4, wherein the cover comprises two pivoting portions at opposite ends of the cutout, an accommodating hole is defined in one of the pivoting portions and communicates with the cutout, and the sleeve is fixedly secured in the accommodating hole of the cover.

7. The electronic device of claim 1, further comprising a mounting member, the base defines a receiving portion for receiving the connecting portion, and the mounting member is mounted to the base for preventing the connecting portion from sliding out of the receiving portion.

8. An electronic device comprising:
a base;
a first magnetic member fixed to the base;
a connecting member slidably mounted to a rear side of the base;
a cover;
a second magnetic member fixed to the cover; and
a hinge arranged between the cover and the connecting member to pivotably connect the cover to the connecting member, the hinge comprising a first interfering member, a second interfering member mated with the first interfering member, and a resilient member, wherein one end of the first interfering member facing the second interfering member forms at least one raised portion; one end of the second interfering member facing the first interfering member forms at least one recessed portion for mating with the at least one raised portion of the first interfering member;
wherein when the cover is closed relative to the base, the at least one raised portion of the first interfering member engages with the second interfering member to compress the resilient member, and the first and second magnetic members are aligned and are attached to each other using magnetism, for retaining the cover in a closed state relative to the base;

wherein to open the cover relative to the base, the cover is pushed to slide forward relative to the base, the first magnetic member of the base and the second magnetic member of the cover are staggered and released from each other, for releasing the cover from the base, and the resilient member of the hinge restores to rotate the first interfering member to make the at least one raised portion of the first interfering member engage in the at least one recessed portion of the second interfering member, to rotate the cover to open relative to the base.

9. The electronic device of claim 8, further comprising a spring arranged between the base and the connecting member, for restoring the connecting member after releasing the cover from the base.

10. The electronic device of claim 8, wherein the hinge further comprises a shaft, a sleeve, and a mounting member; the shaft extends through the first interfering member, the second interfering member, the resilient member, and the sleeve in that order, to engage in the mounting member.

11. The electronic device of claim 10, wherein the resilient member and the second interfering member are received in the sleeve, and the second interfering member is fixedly secured in the sleeve.

12. The electronic device of claim 8, wherein a rear side of the cover defines a cutout, the connecting member comprises a main body and a connecting portion, the main body is slidably fixed to the base, and the connecting member is received in the cutout of the cover.

13. The electronic device of claim 12, wherein one end of the connecting portion defines a fixing hole, and the first interfering member is non-rotatably fixed in the fixing hole of the connecting portion.

14. The electronic device of claim 13, wherein the cover comprises two pivoting portions at opposite ends of the cutout, an accommodating hole is defined in one of the pivoting portions and communicates with the cutout, and the sleeve is fixedly secured in the accommodating hole of the cover.

15. The electronic device of claim 8, further comprising a mounting member, the base defines a receiving portion for receiving the connecting portion, and the mounting member is mounted to the base for preventing the connecting portion from sliding out of the receiving portion.

* * * * *